(12) United States Patent
Rosales Chinchilla et al.

(10) Patent No.: US 11,953,161 B1
(45) Date of Patent: Apr. 9, 2024

(54) MONITORING AND DETECTING PIPELINE LEAKS AND SPILLS

(71) Applicant: Intelcon System C.A., Aventura, FL (US)

(72) Inventors: Andres Emilio Rosales Chinchilla, Caracas (VE); Carlos Rivero, Caracas (VE); Jesus Varajas, Caracas (VE); Jose Luis Buceta, Caracas (VE); Domingo Rafael Vargas, Caracas (VE); Adolfo Anibal Torres Camperos, Caracas (VE)

(73) Assignee: Intelcon System C.A., Aventura, FL (US)

( * ) Notice: Subject to any disclaimer, the term of this patent is extended or adjusted under 35 U.S.C. 154(b) by 0 days.

(21) Appl. No.: 18/302,605

(22) Filed: Apr. 18, 2023

(51) Int. Cl.
*F17D 5/02* (2006.01)
*G06N 3/08* (2023.01)

(52) U.S. Cl.
CPC ............... *F17D 5/02* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,103,410 | A | 4/1992 | Slocum et al. |
| 5,333,115 | A | 7/1994 | Clouser et al. |
| 6,243,657 | B1 | 6/2001 | Tuck et al. |
| 6,343,505 | B1 | 2/2002 | Cook et al. |
| 6,625,569 | B2 | 9/2003 | James et al. |
| 6,739,177 | B2 | 5/2004 | Sato et al. |
| 6,962,043 | B2 | 11/2005 | Venkateswaran et al. |
| 7,082,379 | B1 | 7/2006 | Bickford et al. |
| 7,188,508 | B2 | 3/2007 | Bowles et al. |
| 7,308,385 | B2 | 12/2007 | Wegerich et al. |
| 7,673,525 | B2 | 3/2010 | Huang |
| 7,926,443 | B2 | 4/2011 | Yamada |
| 9,181,911 | B2 | 11/2015 | Fujisawa et al. |

(Continued)

FOREIGN PATENT DOCUMENTS

| | | |
|---|---|---|
| CN | 1184931 A | 6/1998 |
| CN | 101255950 A | 9/2008 |

(Continued)

OTHER PUBLICATIONS

Adegboye, et al. ("Recent advances in pipeline monitoring and oil leakage detection technologies: Principles and approaches" 2019, Sensors, 19(11), p. 2548-2584) (Year: 2019).*

(Continued)

*Primary Examiner* — Roy Y Yi
(74) *Attorney, Agent, or Firm* — Goodwin Procter LLP

(57) ABSTRACT

A system for monitoring pipeline leaks including a data acquisition unit configured to receive measurement data from a plurality of pipeline instruments, the measurement data corresponding to operation of a pipeline, at least one leak detection engine configured to receive at least a portion of the measurement data and generate at least one pipeline leak parameter, a process analyzer configured to receive at least a portion of the measurement data and determine a state of operation of the pipeline, and an orchestrator configured to determine whether a pipeline leak has occurred based on the pipeline leak parameters and the state of operation of the pipeline.

28 Claims, 7 Drawing Sheets

(56) References Cited

U.S. PATENT DOCUMENTS

| | | | |
|---|---|---|---|
| 9,243,971 | B2 | 1/2016 | Hoffman et al. |
| 9,447,752 | B2 | 9/2016 | Kuroki et al. |
| 9,884,213 | B2 | 2/2018 | Barry et al. |
| 10,168,691 | B2 | 1/2019 | Zornio et al. |
| 10,174,855 | B2 | 1/2019 | Michnevitz et al. |
| 10,274,099 | B2 | 4/2019 | Michnevitz et al. |
| 10,458,947 | B2 | 10/2019 | Ishikawa et al. |
| 10,578,514 | B2 | 3/2020 | Tolton |
| 10,678,233 | B2 | 6/2020 | Cella et al. |
| 10,732,621 | B2 | 8/2020 | Cella et al. |
| 11,221,107 | B2 | 1/2022 | Du et al. |
| 11,327,475 | B2 | 5/2022 | Cella et al. |
| 2007/0206521 | A1 | 9/2007 | Osaje |
| 2009/0116521 | A1 | 5/2009 | Ando et al. |
| 2011/0012738 | A1 | 1/2011 | Nakamura et al. |
| 2016/0356666 | A1 | 12/2016 | Bilal et al. |
| 2018/0292289 | A1 | 10/2018 | Hoffman |
| 2020/0088602 | A1* | 3/2020 | Tran .................. F24F 8/10 |
| 2020/0089215 | A1 | 3/2020 | Cella et al. |
| 2022/0011275 | A1 | 1/2022 | Bohorquez Arevalo et al. |
| 2022/0146406 | A1 | 5/2022 | Okabe et al. |

FOREIGN PATENT DOCUMENTS

| | | |
|---|---|---|
| CN | 100504689 C | 6/2009 |
| CN | 102749848 A | 10/2012 |
| CN | 208618527 U | 3/2019 |
| CN | 110107819 A | 8/2019 |
| CN | 110242866 A | 9/2019 |
| CN | 111022941 A | 4/2020 |
| CN | 211040499 U | 7/2020 |
| CN | 111696320 A | 9/2020 |
| CN | 111828845 A | 10/2020 |
| CN | 114186489 A | 3/2022 |
| CN | 217109724 U | 8/2022 |
| CN | 217153277 U | 8/2022 |
| CN | 115345193 A | 11/2022 |
| DE | 4128750 A1 | 3/1993 |
| DE | 102009057359 A1 | 6/2010 |
| EP | 2029966 A1 | 3/2009 |
| GB | 2506836 A | 4/2014 |
| GB | 2506837 A | 4/2014 |
| GB | 2506838 A | 4/2014 |
| GB | 2517411 A | 2/2015 |
| JP | 2000230846 A | 8/2000 |
| JP | 2007327901 A | 12/2007 |
| JP | 2022082294 A | 6/2022 |
| WO | WO-2002086726 A1 | 10/2002 |
| WO | WO-2008150411 A1 | 12/2008 |
| WO | WO-2013040667 A1 | 3/2013 |
| WO | WO-2013172730 A1 | 11/2013 |
| WO | WO-2016114736 A1 | 7/2016 |
| WO | WO-2021211785 | 10/2021 |
| WO | WO-2022072921 A1 | 4/2022 |
| WO | WO-2022187898 A1 | 9/2022 |
| WO | WO-2022200994 A1 | 9/2022 |

OTHER PUBLICATIONS

Hu et al., "Review of model-based and data-driven approaches for leak detection and location in water distribution systems," IWA Publishing, vol. 21 (7), 3282-.3306.

Delgado-Aguil8 aga et al., "Leak diagnosis in pipelines based on a Kalman filter for Linear Parameter Varying systems," Control Engineering Practice, vol. 115, 2021, 1-11.

Choi et al., "A Bayesian approach for a damage growth model using sporadically measured and heterogeneous on-dsite data from a steam turbine," Raliability Engineering and System Safety, 184 (2019) 137-150.

\* cited by examiner

MONITORING AND DETECTING PIPELINE LEAKS AND SPILLS

TECHNICAL FIELD OF THE INVENTION

In general, the subject matter of this disclosure relates to techniques for monitoring and identifying pipeline leaks and spills and, more specifically, for using pipeline models to automatically monitor pipelines.

BACKGROUND

Pipeline leaks and spills can cause serious, and potentially dangerous, problems. The impact and frequency of such spills depend on the materials (e.g., fluids, gasses, etc.) being transported, the operating conditions, the age of the pipeline infrastructure, and mechanical and design failures, among other factors. In many cases, pipelines include leak detection systems to detect pipeline leaks. These leak detection systems often include external and internal methods of leak detection. External methods are based on visual inspections and/or sensors placed outside duct systems of the pipeline. Such external methods operate under the principle of physical detection and localization. Internal methods use sensor measurements that monitor internal parameters in the pipeline duct such as: pressure, temperature, density, viscosity, and mass or volumetric flow. Such internal methods are used for detection and location of the leak based on an algorithm that is executed in real time by a computational system.

SUMMARY

At least one aspect of the present disclosure is directed to a system for monitoring pipeline leaks. The system includes a data acquisition unit configured to receive measurement data from a plurality of pipeline instruments, the measurement data corresponding to operation of a pipeline, at least one leak detection engine configured to receive at least a portion of the measurement data and generate at least one pipeline leak parameter, a process analyzer configured to receive at least a portion of the measurement data and determine a state of operation of the pipeline, and an orchestrator configured to determine whether a pipeline leak has occurred based on the pipeline leak parameters and the state of operation of the pipeline.

In some embodiments, the orchestrator, in response to a determination that a pipeline leak has occurred, is configured to provide a diagnosis of the pipeline leak. In some embodiments, the diagnosis of the pipeline leak includes a location of the pipeline leak and a severity of the pipeline leak. In some embodiments, the plurality of pipeline instruments comprises at least one pressure sensor, flow sensor, temperature sensor, density sensor, or any combination thereof. In some embodiments, the state of operation of the pipeline is one of steady-state, transient, stall, shut-in, or fluid change.

In some embodiments, the system includes a filter service configured to remove noise from the measurement data before the measurement data is provided to the at least one leak detection engine. In some embodiments, the system includes an instrument anomaly detection system configured to receive at least a portion of the measurement data and detect anomalies associated with the plurality of instruments. In some embodiments, the process analyzer is configured to receive the detected anomalies from the instrument anomaly detection system. In some embodiments, the orchestrator is configured to apply weights to the pipeline leak parameters when determining whether a pipeline leak has occurred. In some embodiments, the weight applied to each pipeline leak parameter corresponds to the leak detection engine that generated the pipeline leak parameter.

In some embodiments, the orchestrator is configured to use a Bayesian statistical interference to determine whether a pipeline leak has occurred based on the pipeline leak parameters and the state of operation of the pipeline. In some embodiments, the at least one leak detection engine includes a mass balance engine that includes at least one neural network to generate a leak flow parameter based on flow and pressure measurements of the pipeline. In some embodiments, the at least one neural network is iteratively trained using two or more training data sets. In some embodiments, at least one of the training data sets includes synthetic data generated from a hydraulic simulation of the pipeline. In some embodiments, the at least one leak detection engine includes a pressure flow monitoring engine that includes at least one neural network to generate a leak flow parameter, a leak detection parameter, and a leak location parameter based on flow and pressure measurements of the pipeline. In some embodiments, the at least one neural network is iteratively trained using two or more training data sets. In some embodiments, at least one of the training data sets includes synthetic data generated from a hydraulic simulation of the pipeline.

In some embodiments, the at least one leak detection engine includes a statistical analysis engine that includes at least one neural network to generate a leak detection parameter based on a leak flow parameter. In some embodiments, the at least one neural network is iteratively trained using two or more training data sets. In some embodiments, at least one of the training data sets includes synthetic data generated from a hydraulic simulation of the pipeline.

Another aspect of the present disclosure is directed to a method for monitoring pipeline leaks. The method includes receiving, via a data acquisition unit, measurement data from a plurality of pipeline instruments, the measurement data corresponding to operation of a pipeline, generating, via at least one leak detection engine, at least one pipeline leak parameter based on at least a portion of the measurement data, determining, via a process analyzer, a state of operation of the pipeline based on at least a portion of the measurement data, and determining, via an orchestrator, whether a pipeline leak has occurred based on the pipeline leak parameters and the state of operation of the pipeline.

In some embodiments, the method includes in response to a determination that a pipeline leak has occurred, providing, via the orchestrator, a diagnosis of the pipeline leak. In some embodiments, the diagnosis of the pipeline leak includes a location of the pipeline leak and a severity of the pipeline leak. In some embodiments, the state of operation of the pipeline is one of steady-state, transient, stall, shut-in, or fluid change. In some embodiments, the method includes removing, via a filter service, noise from the measurement data before the measurement data is provided to the at least one leak detection engine. In some embodiments, the method includes detecting, via an instrument anomaly detection system, anomalies associated with the plurality of instruments in the measurement data.

In some embodiments, determining whether a pipeline leak has occurred includes applying weights to the pipeline leak parameters. In some embodiments, the weight applied to each pipeline leak parameter corresponds to the leak detection engine that generated the pipeline leak parameter. In some embodiments, the orchestrator is configured to use a Bayesian statistical interference to determine whether a pipeline leak has occurred based on the pipeline leak parameters and the state of operation of the pipeline. In some embodiments, the at least one leak detection engine includes at least one neural network.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
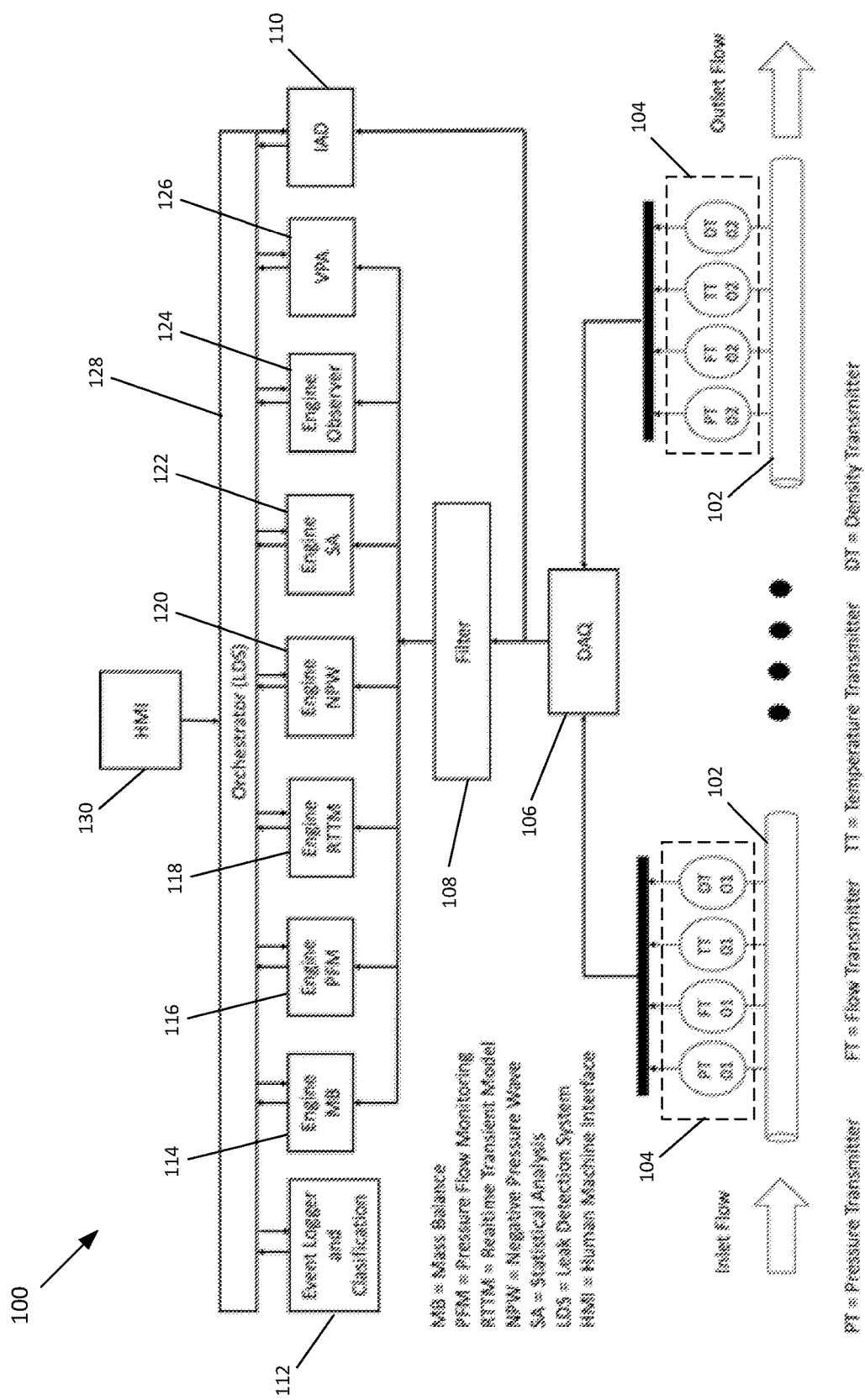
FIG. 1 is a block diagram of a pipeline monitoring system monitoring system in accordance with aspects described herein.

As discussed above, pipeline leaks and spills can cause serious, and potentially dangerous, problems. The impact and frequency of such spills depend on the materials (e.g., fluids, gasses, etc.) being transported, the operating conditions, the age of the pipeline infrastructure, and mechanical and design failures, among other factors. In many cases, pipelines include leak detection systems to detect pipeline leaks. These leak detection systems often include external and internal methods of leak detection. External methods are based on visual inspections and/or sensors placed outside duct systems of the pipeline. Such external methods operate under the principle of physical detection and localization. Internal methods use sensor measurements that monitor internal parameters in the pipeline duct such as: pressure, temperature, density, viscosity, and mass or volumetric flow. Such internal methods are used for detection and location of the leak based on an algorithm that is executed in real time by a computational system.

Often times, pipeline monitoring relies on multidisciplinary teams that include scientists and engineers from different areas of knowledge (e.g., fluid mechanics, instrumentation, signal processing, computing, and mechanical engineers, among other disciplines). It can be challenging for these teams to select the correct computational pipeline monitoring systems to use due to unknown variables associated with the pipeline. For example, such variables may include inaccurate knowledge of the parameters that describe the pipeline, undetected aging and maintenance problems, and scheduled or unplanned pipeline system changes (e.g., the placement of booster pumps, capacity control valves and new branches). In addition, different pipeline operation modes (e.g., stable state, transient mode including pumping start/stop, valves operations, pressure, flow control and pause states like product packaging) may be considered when selecting a monitoring method to apply using the computational system. A common issue among the computational systems is that they rely on an automated or operational procedure to properly recognize the current operational mode and apply the proper method(s) in each case. In addition, computational pipeline monitoring systems may face issues dealing with failure scenarios in sensors, actuators, pumps, obstructions, unwanted blockage by valves, etc., a lack of proper pipeline hydraulic modeling, and lack of sensors with high sensitivity, accuracy, and/or adequate response times.

A computational pipeline monitoring system is typically divided into two different steps (e.g., usually controlled by a state machine). The first step consists of using an inference engine. The inference engine uses the instrument data available in the pipeline. For example, the pipeline may include flowmeters, pressure sensors, temperature sensors, densitometers, viscometers, and valve and pump status sensors. This instrument data is used in a dynamic, hydraulic or statistical model of the system to infer values and metrics (e.g., leakage flow). The second is an alert algorithm which usually is integrated with operational and contingency response systems. The alert algorithm takes the inferred values and provides information about the leak event. In some examples, the alert algorithm provides information about the location, the leakage flow rate, and/or the leak equivalent diameter.

Pipeline regulations (e.g., API 1130, TRFL) recommend the concurrent application of physical models based on the principles of conservation for example of mass, momentum, and energy. One common physical model is the in-line balance model. This model counts the mass coming in, the mass coming out, and the mass accumulated in the duct, to infer a leak. The model monitors a time window of minutes, hours, weeks and months, for example 15 minutes up to 24 hours. Another physical model is the real time transient model (RTTM). This model contrasts variables inferred from the model with redundant measurement variables of duct instruments, mainly pressure and flow. In some examples, an extensive configuration of physical parameters of the pipeline is required. The RTTM uses the mass conservation technique in conjunction with a signature analysis to increase its reliability. Another physical model is the statistical analysis model. This model calculates the probability of product release against the probability of non-release of product. Statistical analysis can be used in conjunction with the mass conservation technique combined with signature analysis to increase its reliability. Another physical model is the pressure/flow monitoring model. This model monitors flow/pressure deviation and limits on the flow/pressure change rate to infer a leak event. In some examples, the relationship between various sensors is examined using an algorithm to detect the leak. Another physical model is the acoustic/negative pressure wave model. This model detects the rarefaction wave that occurs when a break and leak occur in a pipe. However, as described above, these models suffer deficiencies from unknown pipeline variables (e.g., inaccurate knowledge of the parameters that describe the pipeline, undetected aging and maintenance problems, and scheduled or unplanned pipeline system changes, etc.). Such deficiencies can limit the reliability, sensitivity, robustness, and accuracy of the models and the computational pipeline monitoring systems that rely on them.

Accordingly, an improved monitoring system for monitoring pipelines is provided herein. In some examples, the monitoring system combines different methodologies and methods (e.g., mathematical algorithms and statistical tools) with artificial intelligence technologies to create a comprehensive system that detects, measures, and verifies the presence of leaks in pipelines. In some examples, the monitoring system mitigates the risks in the transport of hazardous substances in both liquid and gaseous states. In some examples, the monitoring system uses values or data from field sensors acquired in real time (e.g., pressure, flow, temperature, density, etc.). The monitoring system continuously monitors a duct, and through the application of different highly coupled algorithmic motors, is able to provide a warning that a leak has occurred. In some examples, after detection of the leak, the monitoring system performs a diagnosis to determine the location of the leak. In some examples, the monitoring system calculates the leak flow and the average diameter of the hole in the duct that generated the leak.

To detect a leak, the monitoring system acquires data for a given period of time and with an appropriate frequency. Once the data has been collected, the system performs a predetermined mathematical and statistical analysis process. The analysis process generates parameter estimates based on a pipeline model for normal, abnormal, or atypical operating conditions (e.g., start and stop, transient, shut-in, faults, and leaks). In some examples, the parameter estimates are analyzed using probability and decision criteria to determine whether a leak exists in the pipeline.

FIG. 1 is a block diagram of a pipeline monitoring system 100 in accordance with aspects described herein. In one example, the monitoring system 100 has a microservices architecture. As shown, the monitoring system 100 includes a data acquisition system (DAQ) 106, a filter service 108 (e.g., Gaussian and process noise filter), an instrument anomaly detection (IAD) system 110, an event logger and classification service 112, a compensated mass balance (MB) engine 114, a pressure flow monitoring (PFM) engine 116, a real-time transient model (RTTM) engine 118, a negative pressure wave (NPW) engine 120, a statistical analysis (SA) engine 122, an observer of state engine 124, a virtual process analyzer (VPA) 126, an orchestrator (LDS) 128, and a human machine interface (HMI) 130. In some examples, the monitoring system 100 includes a user authentication service.

In one example, the monitoring system 100 is configured to monitor a pipeline 102. A plurality of instruments 104 are configured to collect measurements associated with the pipeline 102 and the material (e.g., fluid or gas) being carried by the pipeline 102. For example, the plurality of instruments 104 may include at least one pressure transmitter (e.g., PT01, PT02), at least one flow transmitter (e.g., FT01, FT02), at least one temperature transmitter (e.g., TT01, TT02), and at least one density transmitter (e.g., DT01, DT02). In some examples, the measurements collected by the plurality of instruments 104 are provided to the DAQ 106. The DAQ 106 may aggregate (and process) the collected measurements before providing them to the filter service 108.

In one example, the filter service 108 is configured to eliminate (or reduce) white noise introduced in the measurement signals. In some examples, the filter service 108 is configured to average the input data stream coming from the sensor signals to reduce noise. In some examples, the filter service 108 applies a low-pass filter to the input data stream(s). To treat colored noise (e.g., pink noise, blue noise, brown noise, etc.), the filter service 108 may apply one or more whitening filters. Such filters eliminate the autocorrelation of the sensor signals (e.g., the deterministic components of the signal). In some examples, the filter service 108 uses a linear predictive coder, which uses a model of the deterministic components of the signals.

In some examples, the collected measurements are also provided to the IAD 110 (e.g., in parallel with the filter service 108). The IAD 110 is responsible for monitoring the correct functioning of signals from the plurality of instruments 104. The IAD 110 is configured to verify that the plurality of instruments 104 are not operating with failures or other disturbances that may affect or bias the measurements. Such failures may include frozen data, out of range, outliers, sensor drift. In some examples, the IAD 110 includes one or more neural networks. For example, recurrent neural networks of the LSTM type may be used by collecting sensor data (e.g., via the plurality of instruments 104), preprocessing the data (e.g., via the DAQ 106 and the filter service 108), building an LSTM model (or models), and using the model(s) to detect sensor anomalies in real time. This technique is useful for detecting changes in the response of pressure and flow sensors over time and for taking corrective action before major system failures occur.

In some examples, the IAD 110 (or the LSTM model) is trained using one or more sets of training data. For example, the IAD 110 may be trained in a first stage using a first set of training data and in a second stage using a second set of training data. In one example, a hydraulic simulation is used to generate pipeline specific data (e.g., based on the parameters of the pipeline). Such data may be used as the first set of training data to train the IAD 110. For example, the first set of training data may include synthetic data values for the measurements collected/recorded by the plurality of instruments 104. A confusion matrix may be obtained to determine the overall performance of the IAD 110. In some examples, at least one parameter of the IAD 110 is adjusted based on the confusion matrix. Once adjusted, the IAD 110 may be retrained using a different set of synthetic data (e.g., the second set of training data) to improve the accuracy of the IAD 110. It should be appreciated that the IAD 110 may be trained (or retrained) using real data collected from the pipeline.

In one example, the filtered measurement data (i.e., output from the filter service 108) is provided to the engines 114-122. In some examples, at least a portion of the engines 114-122 are configured to detect and/or diagnose pipeline leaks based on the filtered measurement data. In some examples, the use of redundant detection analyses (i.e., multiple engines) improves the accuracy and reliability of the system 100.

Figure 2:
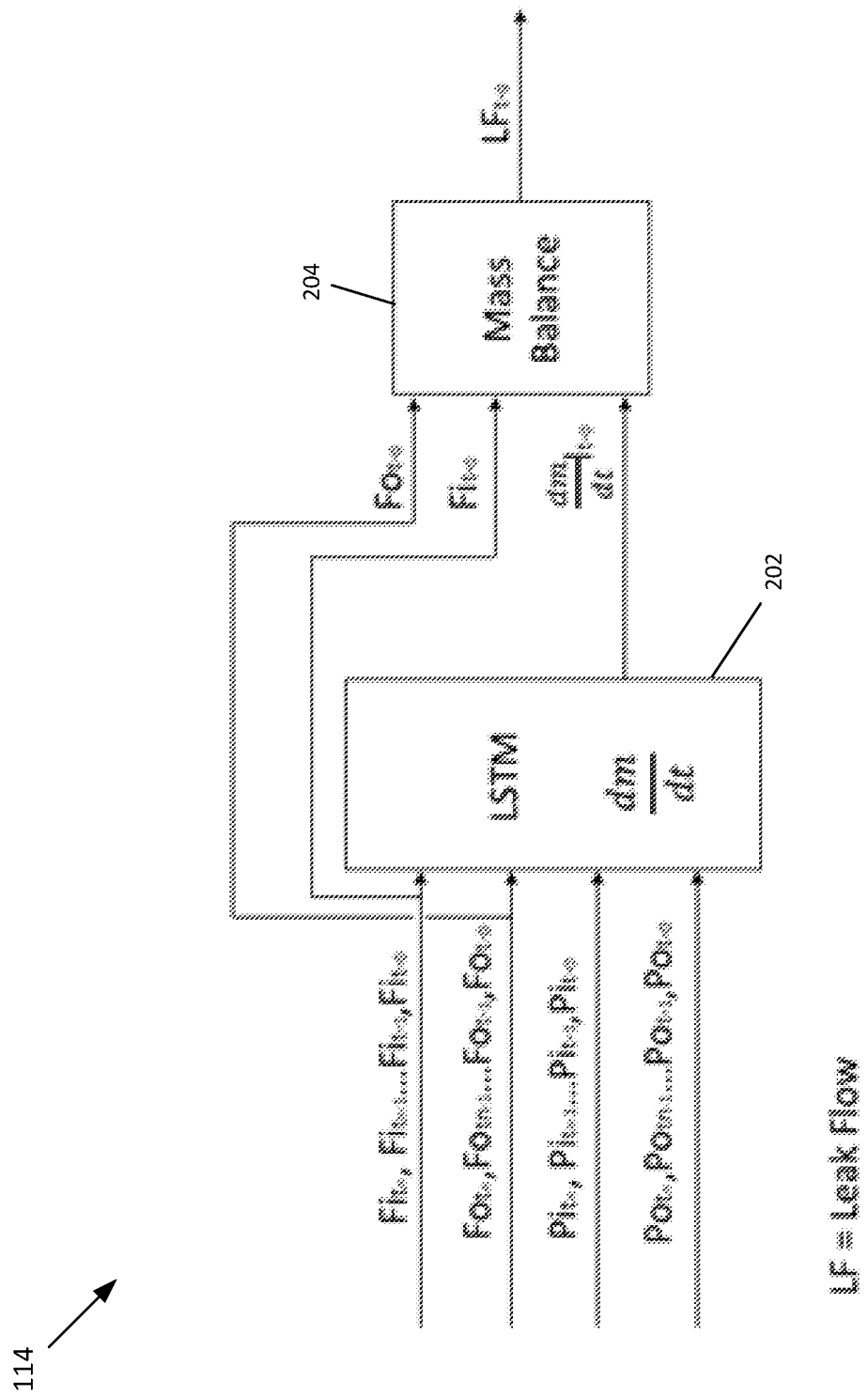
FIG. 2 is a block diagram of a mass balance (MB) engine in accordance with aspects described herein.

One engine used to detect and/or diagnose pipeline leaks based on the filtered measurement data is the MB engine 114. In one example, the MB engine 114 is based on the principle of conservation of mass, which states that the mass that enters the system must be equal to the mass that leaves the system. In some examples, the MB engine 114 considers mass that accumulates due to a change of inventory in the system (i.e., the pipeline). In some examples, the MB engine 114 is a data-driven model that is calibrated using pipeline operations data. For example, FIG. 2 illustrates a block diagram of the MB engine 114. As shown, the MB engine 114 includes recurrent neural networks (LSTM) 202. The LSTM 202 receives time series input data, such as inlet flow (Fi), outlet flow (Fo), inlet pressure (Pi), and outlet pressure (Po). Based on this input data, the LSTM 202 determines the change in mass over time (dm/dt). The inlet flow Fi, the outlet flow Fo, and the change in mass over time dm/dt are provided to a mass balance model 204 which generates the leak flow (LF) estimate.

In some examples, the LSTM model 202 is trained using one or more sets of training data. For example, the LSTM model 202 may be trained in a first stage using a first set of training data and in a second stage using a second set of training data. In one example, a hydraulic simulation is used to generate pipeline specific data (e.g., based on the parameters of the pipeline). Such data may be used as the first set of training data to train the LSTM model 202. For example, the first set of training data may include synthetic data values for the inlet flow (Fi), outlet flow (Fo), inlet pressure (Pi), and outlet pressure (Po) of the pipeline. A confusion matrix may be obtained to determine the overall performance of the LSTM model 202. In some examples, at least one parameter of the LSTM model 202 is adjusted based on the confusion matrix. Once adjusted, the LSTM model 202 may be retrained using a different set of synthetic data (e.g., the second set of training data) to improve the accuracy of the LSTM model 202 (and the MB engine 114). It should be appreciated that the LSTM model 202 may be trained (or retrained) using real data collected from the pipeline.

Figure 3:
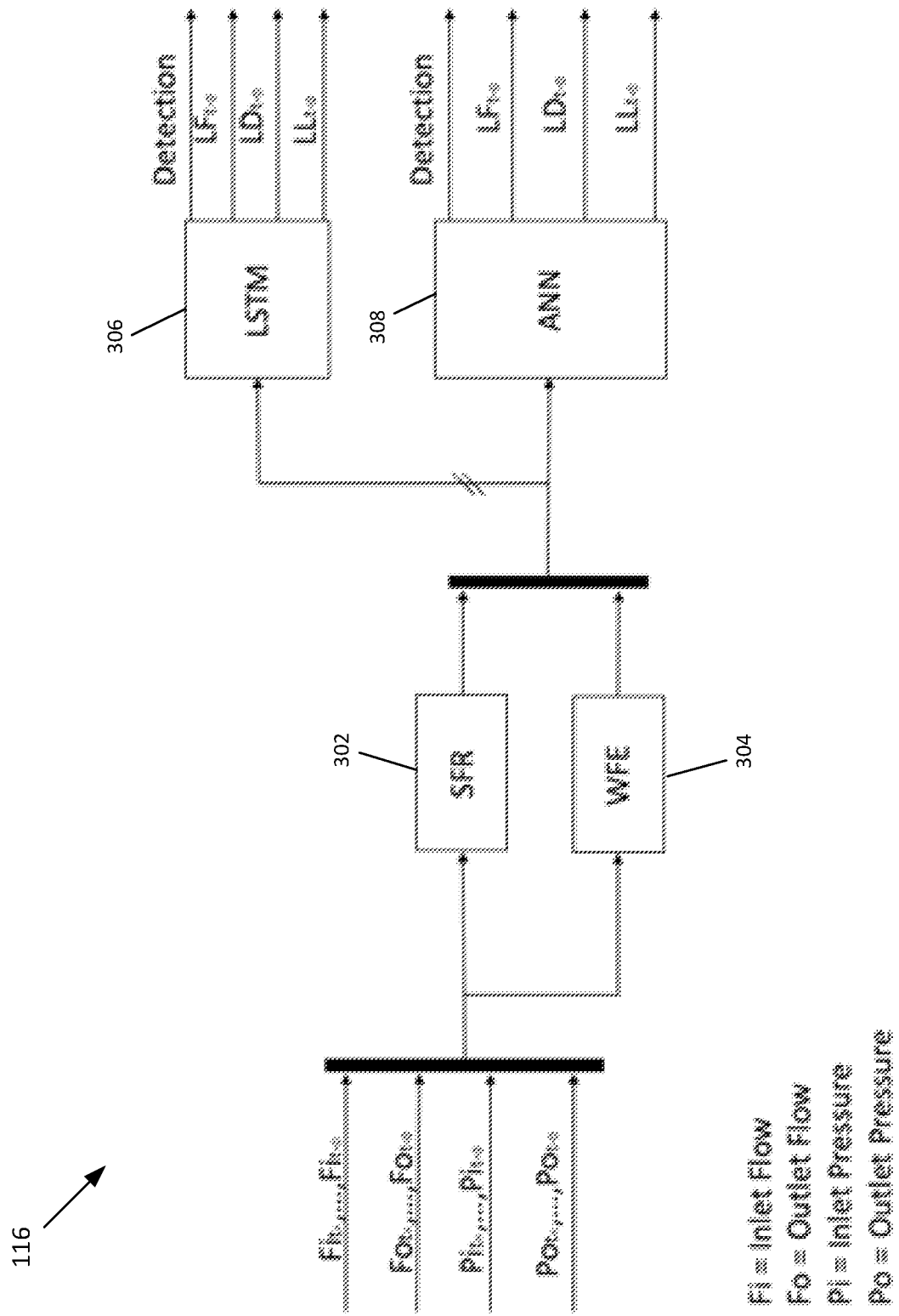
FIG. 3 is a block diagram of a pressure flow monitoring (PFM) engine in accordance with aspects described herein.

Another engine used to detect and/or diagnose pipeline leaks based on the filtered measurement data is the PFM engine 116. In one example, the PFM engine 116 performs the detection and diagnosis (e.g., leak flow, leak size, leak location, etc.) using a combination of characteristic extraction and pattern recognition techniques. FIG. 3 illustrates a block diagram of the PFM engine 116. In one example, the PFM engine 116 includes a static feature extraction (SFE) module 302 and a wavelet feature extraction (WFE) module 304. The SFE module 302 and the WFE module 304 each receive time series input data, such as inlet flow (Fi), outlet flow (Fo), inlet pressure (Pi), and outlet pressure (Po). The SFE module 302 and the WFE module 304 are both configured to extract characteristics (or features) of the input data. Such extractions are provided to an LSTM 306 and/or an artificial neural network (ANN) 308. In one example, the LSTM 306 operates as a behavior classifier that accounts for the prior behavior of the input variable set to make leak decisions and diagnoses. Likewise, the ANN 308 operates as a pattern recognition classifier that detects if the input variable pattern corresponds to a leak. If so, the input variable pattern is passed through another classifier (or pattern recognition regressor) to diagnose the leak. In some examples, the LSTM 306 and the ANN 308 are both configured to output a leak detection signal, a leak flow estimate (LF), a leak diameter (LD), and a leak location (LL). In some examples, the leak diagnosis process is performed immediately following the initial leak detection (e.g, based on the leak detection signal). It should be appreciated that the PFM engine 116 considers the current operational status of the pipeline when diagnosing the leak (e.g., steady state, transient, stall, shut-in, etc.).

In some examples, the LSTM model 306 and the ANN model 308 are trained using one or more sets of training data. For example, the LSTM model 306 and the ANN model 308 may be trained in a first stage using a first set of training data and in a second stage using a second set of training data. In some examples, the LSTM model 306 and the ANN model 308 are trained using the same data sets; however, in other examples, the LSTM model 306 and the ANN model 308 may be trained using different data sets. In one example, a hydraulic simulation is used to generate pipeline specific data (e.g., based on the parameters of the pipeline). Such data may be used as the first set of training data to train the LSTM model 306 and/or the ANN model 308. For example, the first set of training data may include features or characteristics of synthetic input data (e.g., that would be extracted by the SFE module 302 and the WFE module 304). In some examples, the synthetic data includes the inlet flow (Fi), outlet flow (Fo), inlet pressure (Pi), and outlet pressure (Po) of the pipeline. As such, the synthetic data may be provided to the SFE module 302 and the WFE module 304 and the corresponding extracted features (or characteristics) may be included in the first set of training data. A confusion matrix may be obtained to determine the overall performance of the LSTM model 306 and the ANN model 308. In some examples, at least one parameter of the LSTM model 306 and/or the ANN model 308 is adjusted based on the confusion matrix. Once adjusted, the LSTM model 306 and/or the ANN model 308 may be retrained using a different set of synthetic data (e.g., the second set of training data) to improve the accuracy of the models 306, 308 (and the PFM engine 116). It should be appreciated that the LSTM model 306 and/or the ANN model 308 may be trained (or retrained) using real data collected from the pipeline.

Another engine used to detect and/or diagnose pipeline leaks based on the filtered measurement data is the RTTM engine 118. The RTTM engine 118 is configured to receive detailed information about the duct, equipment, and fluid properties. In some examples, the RTTM engine 118 receives measurements related to flow, pressure, and temperature. In some examples, the RTTM engine 118 receives measurements of environmental temperature, fluid density, and viscosity. The RTTM engine 118 may be used with materials (e.g., fluids) where the properties remain largely unchanged or predictable during the pipeline life cycle (e.g., liquid hydrocarbons and water). In some examples, the RTTM engine 118 applies to a system of coupled differential equations derived from a hydraulic analysis of the system. The system of coupled differential equations may be solved using various algorithms. In some examples, the RTTM engine 118 uses an implicit variable integration method suitable for rigid systems.

Figure 4:
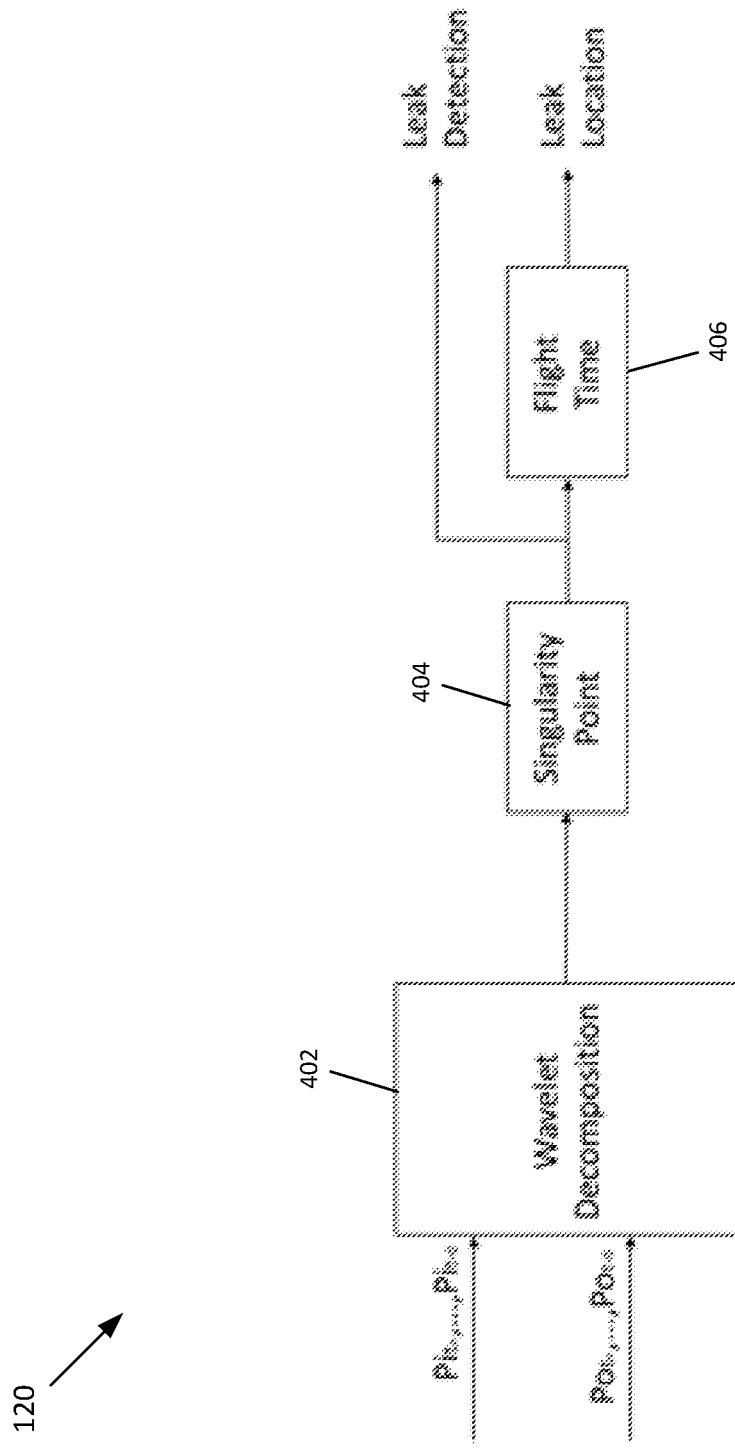
FIG. 4 is a block diagram of a negative pressure wave (NPW) engine in accordance with aspects described herein.

Another engine used to detect and/or diagnose pipeline leaks based on the filtered measurement data is the NPW engine 120. When a leak occurs in a pipeline, variations of the waveform pressures are generated that are detected by the different sensors at different times according to the location of the sensors with respect to the leak. These signals are treated in the time and frequency domain using wavelet decomposition and through it the singularity point is detected. For example, FIG. 4 illustrates a block diagram of the NPW engine 120. As shown, the wavelet decomposition module 402 that receives time series input data, such as inlet pressure (Pi) and outlet pressure (Po). The wavelet decomposition module 402 performance time and frequency domain analyses to extract wavelets from the input data. The wavelets are provided to a singularity point module 404 that detects a singularity point (e.g., jumps, cusps, or other sharp changes) in the wavelet data. In some examples, the singularity point module 404 is configured to output a leak detection signal. Subsequently, a flight time module 406 is configured to make use of the propagation of the speed of the wave (or wavelets). In some examples, based on the speed of the wave and the time that each wave reached the various sensors (or instruments), the location of the leak can be located. As such, the flight time module 406 may output a leak location signal. In some examples, the modules 402-406 correspond to different layers (or models) of a neural network architecture (e.g., an LSTM).

Figure 5:
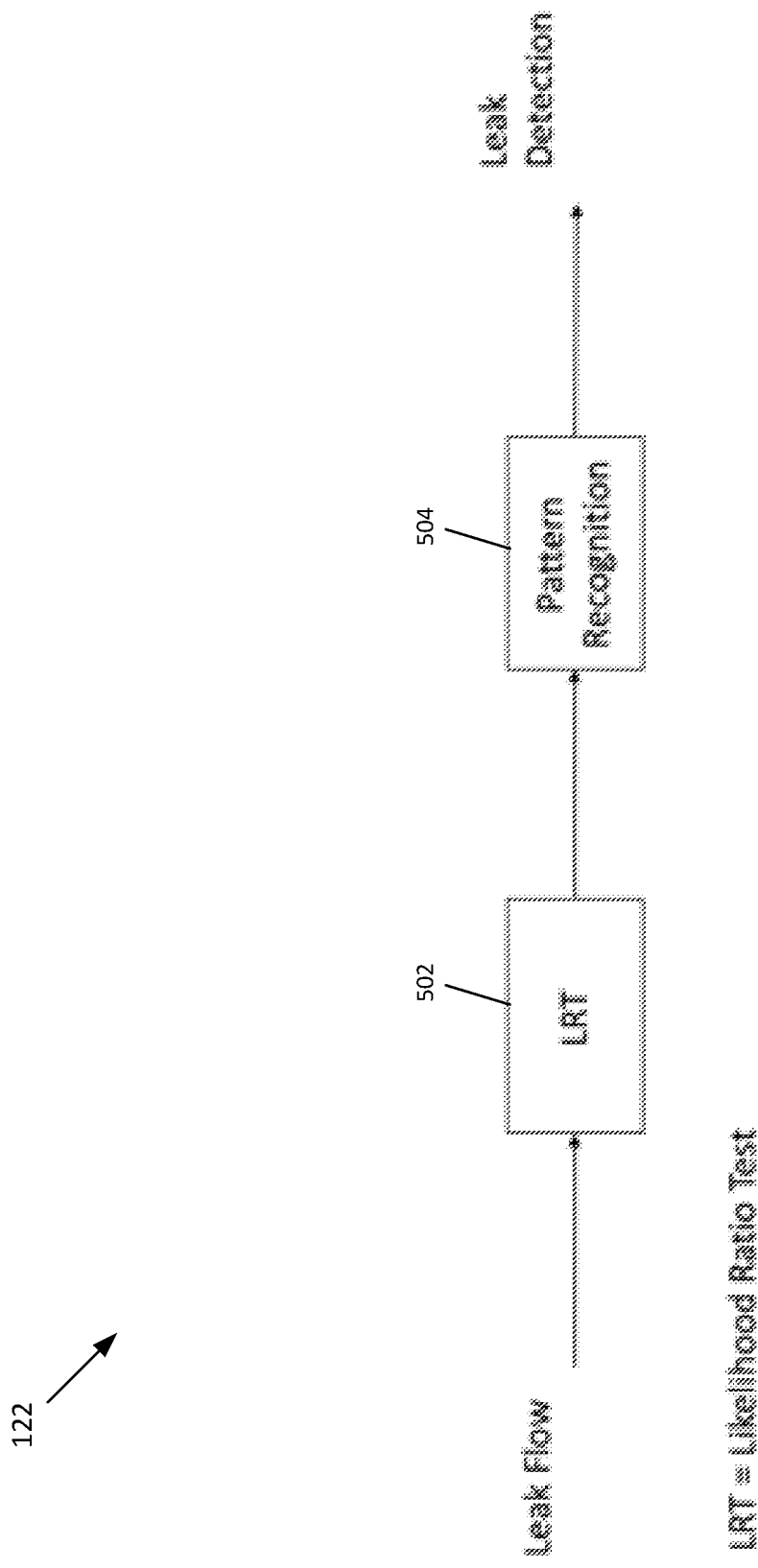
FIG. 5 is a block diagram of a statistical analysis (SA) engine in accordance with aspects described herein.

Another engine used to detect and/or diagnose pipeline leaks based on the filtered measurement data is the SA engine 122. In one example, the SA engine 122 performs a probability ratio test (LRT), to the calculated (or estimated) leakage flow, to corroborate the leakage event. If the LRT yields a positive result, then a pattern recognition technique is applied. For example, FIG. 5 illustrates a block diagram of the SA engine 122. As shown, the input leak flow is provided to an LRT module 502 which performs the LRT analysis. If the LRT analysis indicates that a leakage event is likely, the input leak flow is provided to a pattern recognition module 504. In one example, the pattern recognition module 504 includes an ANN model and/or an LSTM model that analyzes the leak flow to determine if a leak is present (e.g., based on a pattern of the leak flow data).

In some examples, the pattern recognition module 504 (e.g., the ANN model and/or the LSTM model) is trained using one or more sets of training data. For example, the pattern recognition module 504 may be trained in a first stage using a first set of training data and in a second stage using a second set of training data. In one example, a hydraulic simulation is used to generate pipeline specific data (e.g., based on the parameters of the pipeline). Such data may be used as the first set of training data to train the pattern recognition module 504. For example, the first set of training data may include synthetic data values for leak flow data of the pipeline. A confusion matrix may be obtained to determine the overall performance of the pattern recognition module 504. In some examples, at least one parameter (e.g., a weighting criteria) of the pattern recognition module 504 is adjusted based on the confusion matrix. Once adjusted, the pattern recognition module 504 may be retrained using a different set of synthetic data (e.g., the second set of training data) to improve the accuracy of the pattern recognition module 504 (and the SA engine 122). It should be appreciated that the pattern recognition module 504 may be trained (or retrained) using real data collected from the pipeline.

Figure 6:
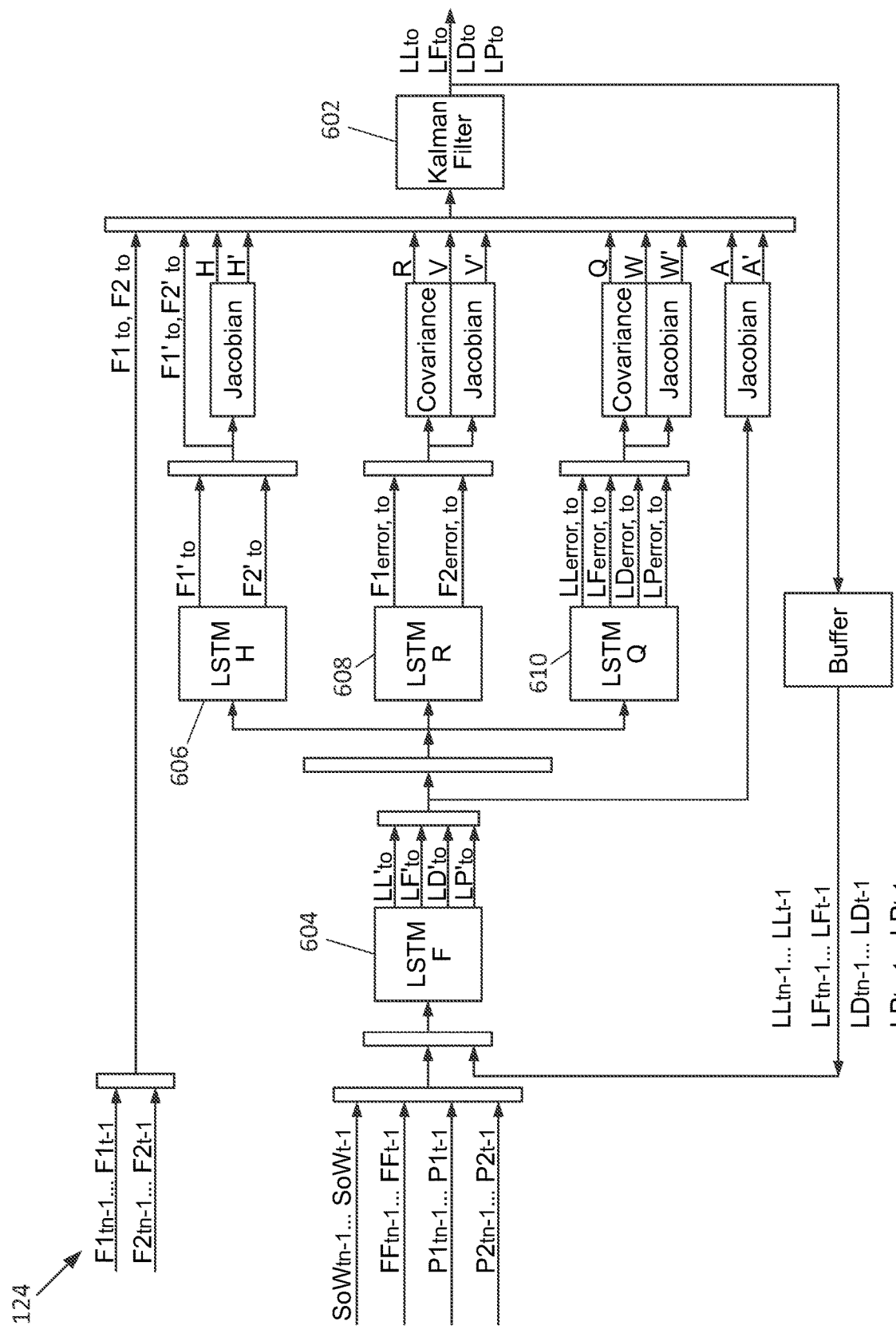
FIG. 6 is an observer engine in accordance with aspects described herein.

In some examples, the observer engine 124 is used to detect and/or diagnose pipeline leaks based on the filtered measurement data. FIG. 6 illustrates a block diagram of the observer engine 124. In one example, the observer engine 124 includes a Kalman filter 602, which is an algorithm that serves to identify the hidden (e.g., non-measurable) state of a linear dynamical system. The Kalman filter algorithm allows the observer engine 124 to obtain internal pipelines states for the leak detection (e.g., leak flow) and a diagnosis of the leak (e.g., leak location, leak diameter, pressure at the leakage point, and leakage flow). By use of a recursive algorithm, the observer engine 124 estimates the states of the process in a previous time t−1 and updates them through a transient model of the process in real time (e.g., through the use of LSTM recurrent neural networks). The Kalman filter 602 coupled with LSTM networks has two phases: the "prediction" phase and the "correction" phase. In the prediction phase, the observer engine 124 uses a first LSTM 604 (LSTM F). The first LSTM 604 obtains the estimated internal states, which are used for the calculation of redundant variables using a second LSTM 606 (LSTM H). In some examples, the estimated internal states include speed of wave (SoW), friction factor (FF), inlet pressure (P1) and outlet pressure (P2). The error of these predictions is calculated by using a third LSTM 608 (LSTM Q) and a fourth LSTM 610 (LSTM R). In the correction phase, the prior estimations are corrected using an extended Kalman algorithm for nonlinear systems. In some examples, an error covariance matrix of predictions is calculated. Likewise, Jacobian matrices that project future states from previous states may be calculated to produce modified estimates of the internal states. Both phases are coupled into a predictor-corrector complex, based on artificial intelligence models that result in a recursive algorithm that is implemented in real time for leak detection and diagnosis.

In some examples, the observer engine 124 (e.g., the LSTM models 604-610) is trained using one or more sets of training data. For example, the observer engine 124 may be trained in a first stage using a first set of training data and in a second stage using a second set of training data. In one example, a hydraulic simulation is used to generate pipeline specific data (e.g., based on the parameters of the pipeline). Such data may be used as the first set of training data to train the observer engine 124. For example, the first set of training data may include synthetic data values for the input data provided to the first LSTM 604 and/or the estimated internal states provided to the second LSTM 606, the third LSTM 608, and the fourth LSTM. A confusion matrix may be obtained to determine the overall performance of the observer engine 124. In some examples, at least one parameter (e.g., a weighting criteria) of the observer engine 124 (e.g., of the LSTM models) is adjusted based on the confusion matrix. Once adjusted, the observer engine 124 may be retrained using a different set of synthetic data (e.g., the second set of training data) to improve the accuracy of the observer engine 124. It should be appreciated that the observer engine 124 may be trained (or retrained) using real data collected from the pipeline.

The VPA 126 is an autonomous system that analyzes and classifies in real-time the behavior of each of the components of the pipeline. In some examples, the VPA 126 enables the identification of the current operating condition of the pipeline and its correlation with the observed measurements. The operating condition (or state, mode, status, etc.) of the pipeline may be transient (e.g., pumping changes), steady state, stalls, shut-in, or transport operations. In this way, not only are the identification of leaks achieved, but also the detection of any anomaly or changes in the regular operation of the pipeline for subsequent reporting and analysis. In some examples, the VPA 126 has an internal learning system that uses feedback of the operations carried out by the pipeline (and related components). As such, the VPA 126 enables operational anomalies to be identified and provides diagnostic information of such anomalies to provide safer and more reliable pipeline operations.

In one example, the orchestrator 128 is responsible for making decisions based on each of the individual detection engines and data delivered by the VPA 126. For example, the orchestrator 128 may use a Bayesian inference statistical methodology to weigh the detection and diagnostic probabilities of each of the individual detection engines based on data delivered by the VPA. In some examples, the orchestrator 128 assigns different weights to pipeline leak parameters generated by each detection engine based on the operational state of the pipeline. For example, a first detection engine (e.g., the MB engine 114) may provide a higher level of accuracy than a second detection engine (e.g., the PFM engine 116) during a specific operational state. As such, the parameters generated by the first detection engine may be weighted higher than the parameters generated by the second detection engine when the pipeline is operating in such a state. In some examples, the orchestrator 128 allows false alarms to be minimized and obtains better accuracy and sensitivity as a comprehensive leak detection application.

The HMI 130 allows the user(s) to view the status of the pipeline 102 and to control the monitoring system 100. In some examples, the HMI 130 includes a dashboard that enables the user to monitor various parameter relating to pipeline performance. In some examples, the HMI 130 allows the user to view specific measurements collected by specific instruments (e.g., of the plurality of instruments 104). The HMI 130 may present pipeline leak information to the user. For example, the HMI 130 may display the leak status, location, flow rate, etc. In some examples, the HMI 130 provides an alarm to alert the user(s) of a leak. In some examples, the HMI 130 enables the user to enter parameters relating to the pipeline 102 (e.g., aging information).

The event logger and classification service 112 is configured to capture all relevant operational events and conditions (e.g., type of product, product changes, pump changes, etc.) with respect to pipeline operation. In some examples, the event logger and classification service 112 captures the pipeline operator's inputs and observations. Likewise, the event logger and classification service 112 may capture the pipeline operator's inputs and observations. With this information, the event logger and classification service 112 may generate auditable reports of leak events (e.g., detection, response, restore operations).

As described above, the monitoring system 100 is used to monitor and detect pipeline spills in real-time. In some examples, the monitoring system 100 provides an automatic detection of operational pipeline changes (e.g., via the VPA 126).

Figure 7:
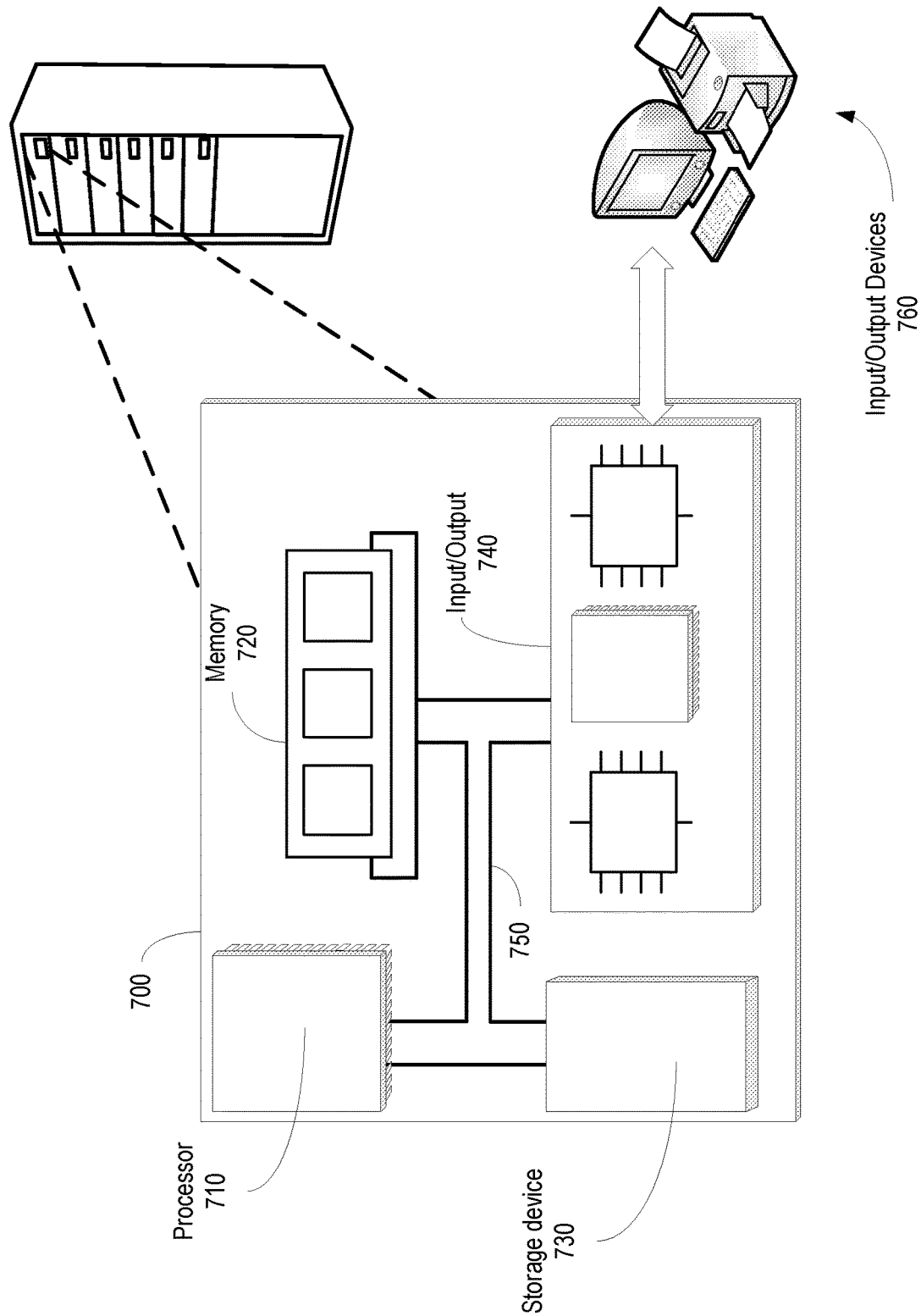
FIG. 7 is a diagram of an example computer system.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. In some implementations, the processor 710 is a programmable (or reprogrammable) general purpose microprocessor or microcontroller. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a nonvolatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for monitoring pipeline leaks, comprising:
a data acquisition unit configured to receive measurement data from a plurality of pipeline instruments, the measurement data corresponding to operation of a pipeline;
at least one leak detection engine configured to receive at least a portion of the measurement data and generate at least one pipeline leak parameter;
a process analyzer configured to determine a state of operation of the pipeline based on at least a portion of the measurement data; and
an orchestrator configured to:
select a plurality of weights based on the state of operation of the pipeline;
apply the plurality of weights selected based on the state of operation of the pipeline to the pipeline leak parameters; and
determine whether a pipeline leak has occurred based on the weighted pipeline leak parameters.

2. The system of claim 1, wherein the orchestrator, in response to a determination that a pipeline leak has occurred, is configured to provide a diagnosis of the pipeline leak.

3. The system of claim 2, wherein the diagnosis of the pipeline leak includes a location of the pipeline leak and a severity of the pipeline leak.

4. The system of claim 1, wherein the plurality of pipeline instruments comprises at least one pressure sensor, flow sensor, temperature sensor, density sensor, or any combination thereof.

5. The system of claim 1, wherein the state of operation of the pipeline is one of steady-state, transient, stall, shut-in, or fluid change.

6. The system of claim 1, further comprising:
a filter service configured to remove noise from the measurement data before the measurement data is provided to the at least one leak detection engine.

7. The system of claim 1, further comprising:
an instrument anomaly detection system configured to receive at least a portion of the measurement data and detect anomalies associated with the plurality of instruments.

8. The system of claim 7, wherein the process analyzer is configured to receive the detected anomalies from the instrument anomaly detection system.

9. The system of claim 1, wherein the weight applied to each pipeline leak parameter corresponds to the leak detection engine that generated the pipeline leak parameter.

10. The system of claim 1, wherein the orchestrator is configured to use a statistical inference to determine whether a pipeline leak has occurred based on the weighted pipeline leak parameters.

11. The system of claim 1, wherein the at least one leak detection engine includes a mass balance engine that includes at least one neural network to generate a leak flow parameter based on flow and pressure measurements of the pipeline.

12. The system of claim 11, wherein the at least one neural network is iteratively trained using two or more training data sets.

13. The system of claim 12, wherein at least one of the training data sets includes synthetic data generated from a hydraulic simulation of the pipeline.

14. The system of claim 1, wherein the at least one leak detection engine includes a pressure flow monitoring engine that includes at least one neural network to generate a leak flow parameter, a leak detection parameter, and a leak location parameter based on flow and pressure measurements of the pipeline.

15. The system of claim 14, wherein the at least one neural network is iteratively trained using two or more training data sets.

16. The system of claim 15, wherein at least one of the training data sets includes synthetic data generated from a hydraulic simulation of the pipeline.

17. The system of claim 1, wherein the at least one leak detection engine includes a statistical analysis engine that includes at least one neural network to generate a leak detection parameter based on a leak flow parameter.

18. The system of claim 17, wherein the at least one neural network is iteratively trained using two or more training data sets.

19. The system of claim 18, wherein at least one of the training data sets includes synthetic data generated from a hydraulic simulation of the pipeline.

20. A method for monitoring pipeline leaks, comprising:
receiving, via a data acquisition unit, measurement data from a plurality of pipeline instruments, the measurement data corresponding to operation of a pipeline;
generating, via at least one leak detection engine, at least one pipeline leak parameter based on at least a portion of the measurement data;
determining, via a process analyzer, a state of operation of the pipeline based on at least a portion of the measurement data;
selecting, via an orchestrator, a plurality of weights based on the state of operation of the pipeline;
applying, via the orchestrator, the plurality of weights selected based on the state of operation of the pipeline to the pipeline leak parameters; and
determining, via the orchestrator, whether a pipeline leak has occurred based on the weighted pipeline leak parameters.

21. The method of claim 20, further comprising:
in response to a determination that a pipeline leak has occurred, providing, via the orchestrator, a diagnosis of the pipeline leak.

22. The method of claim 21, wherein the diagnosis of the pipeline leak includes a location of the pipeline leak and a severity of the pipeline leak.

23. The method of claim 20, wherein the state of operation of the pipeline is one of steady-state, transient, stall, shut-in, or fluid change.

24. The method of claim 20, further comprising:
removing, via a filter service, noise from the measurement data before the measurement data is provided to the at least one leak detection engine.

25. The method of claim 20, further comprising:
detecting, via an instrument anomaly detection system, anomalies associated with the plurality of instruments in the measurement data.

26. The method of claim 20, wherein the weight applied to each pipeline leak parameter corresponds to the leak detection engine that generated the pipeline leak parameter.

27. The method of claim 20, wherein the orchestrator is configured to use a statistical inference to determine whether a pipeline leak has occurred based on the weighted pipeline leak parameters.

28. The method of claim 20, wherein the at least one leak detection engine includes at least one neural network.

* * * * *